US012746691B2

(12) United States Patent
Lacki et al.

(10) Patent No.: US 12,746,691 B2
(45) Date of Patent: Sep. 29, 2026

(54) MULTIMODAL HAPTIC TOOL AND METHOD USING SAME

(71) Applicant: Haply Robotics Inc., Montreal (CA)

(72) Inventors: Maciej Bartosz Lacki, Montreal (CA); Felix Desourdy, Montreal (CA); Antoine Weill-Duflos, Montreal (CA); Colin Gallacher, Montreal (CA)

(73) Assignee: Haply Robotics, Inc., Montreal (CA)

( * ) Notice: Subject to any disclaimer, the term of this patent is extended or adjusted under 35 U.S.C. 154(b) by 0 days.

(21) Appl. No.: 19/106,840

(22) PCT Filed: Jul. 28, 2023

(86) PCT No.: PCT/CA2023/051018
§ 371 (c)(1),
(2) Date: Feb. 26, 2025

(87) PCT Pub. No.: WO2024/020695
PCT Pub. Date: Feb. 1, 2024

(65) Prior Publication Data

US 2026/0001233 A1 Jan. 1, 2026

Related U.S. Application Data

(60) Provisional application No. 63/392,987, filed on Jul. 28, 2022.

(51) Int. Cl.
*B25J 13/02* (2006.01)
*B25J 9/00* (2006.01)

(52) U.S. Cl.
CPC ............. *B25J 13/025* (2013.01); *B25J 9/009* (2013.01)

(58) Field of Classification Search
CPC ................................ B25J 13/025; B25J 9/009
See application file for complete search history.

(56) References Cited

U.S. PATENT DOCUMENTS

2001/0002098 A1 5/2001 Hannpaa et al.
2015/0081092 A1* 3/2015 Jacobsen .................. B25J 5/007 901/1

(Continued)

FOREIGN PATENT DOCUMENTS

GB 2554876 A 4/2018
WO 2022053873 A1 3/2022

OTHER PUBLICATIONS

International Searching Authority—Candadian Intellectual Property Office; International Search Report filed in corresponding International Application No. PCT/CA2023/051018, dated Oct. 10, 2023; 3 pages.

(Continued)

*Primary Examiner* — Khoi H Tran
*Assistant Examiner* — Tristan J Greiner
(74) *Attorney, Agent, or Firm* — Black McCuskey

(57) ABSTRACT

Described are various embodiments of a multimodal haptic tool and method using same. In one embodiment, the multimodal tool comprises a body comprising one or more coupling portions, each coupling portion configured to be releasably mechanically coupled to a distinct haptic device. The tool is configured so that upon being coupled to two or more distinct haptic devices, being usable with each distinct haptic device simultaneously as a single haptic device having a greater number of degrees of freedom than the initial number of degrees of freedom of each distinct haptic device alone. In some embodiments, a kinematic or dynamical model used to operate the haptic devices is selected based on the number of haptic devices the tool is connected to.

2 Claims, 7 Drawing Sheets

(56) References Cited

U.S. PATENT DOCUMENTS

2015/0246446 A1* 9/2015 Casanelles Moix .......................... B25J 15/0052 414/226.01
2015/0343631 A1* 12/2015 Martinez-Esponda ...................... B25J 15/0023 74/490.03
2017/0121129 A1* 5/2017 Mylonas ................ B25J 13/025
2018/0132953 A1* 5/2018 Neupert ................ B25J 13/085
2019/0329422 A1 10/2019 Hongo

OTHER PUBLICATIONS

International Searching Authority—Candadian Intellectual Property Office; Written Opinion filed in corresponding International Application No. PCT/CA2023/051018, dated Oct. 4, 2023; 4 pages.

* cited by examiner

MULTIMODAL HAPTIC TOOL AND METHOD USING SAME

CROSS-REFERENCE TO RELATED APPLICATIONS

This application is a National Phase filing of International Application Ser. No. PCT/CA2023/051018, for a MULTIMODAL HAPTIC TOOL AND METHOD USING SAME, filed Jul. 28, 2023, which itself claims the benefit of U.S. Provisional Application No. 63/392,987 filed Jul. 28, 2022, and both are incorporated herein by reference in their entireties.

FIELD OF THE DISCLOSURE

The present disclosure relates to haptic force feedback devices, and, in particular, to a multimodal haptic tool and method using same.

BACKGROUND

A key characteristic of haptic devices is their number of actuated (active) degrees-of-freedom (DOF). A 3-DOF device can be used to 3D spatial geometry to the user, while a 6-DOF device can generate all the forces and torques providing the most accurate force feedback. The number of active DOF is an intrinsic property of a haptic device which cannot be changed without modifying the hardware of the device. In many applications, two devices can be used together to provide force feedback to both hands of the user. Two devices can also be rigidly connected together to produce a 5-DOF device. To achieve this, the user must carefully attach two controllers at specified locations, develop mathematical models of the device kinematics, and then attach the two devices with a rigid tool. Use of the devices in their original mode requires the process to be reversed.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

A need exists for multimodal haptic tool and method using same that allow for multimodal control of haptic devices such that they can produce a wider range of force-feedback. Advantageously, the multimodal tool described herein, in accordance with different embodiments, may be seamlessly attached or coupled to one or more haptic force feedback devices simultaneously, thereby increasing the available number of degrees of freedom for force feedback.

In accordance with one aspect, there is provided a multimodal tool comprising: a body comprising one or more coupling portions, each coupling portion configured to be releasably mechanically coupled to a distinct haptic device;

wherein upon said multimodal tool being coupled to two or more distinct haptic devices, the multimodal tool being configured to be usable with each distinct haptic device simultaneously as a single haptic device having a greater number of degrees of freedom than the initial number of degrees of freedom of each distinct haptic device alone.

In one embodiment, the multimodal tool further comprises housed in said body at least one body sensor configured to measure an orientation or a three-dimensional position of said tool.

In one embodiment, the multimodal tool further comprises an attachment sensor housed in said body configured to detect whether each coupling portion is mechanically coupled or not to said distinct haptic device.

In one embodiment, the body is an elongated body comprising a coupling portion at each opposite end thereof.

In one embodiment, a length of said elongated body is extendable.

In one embodiment, the body comprises an inner portion telescopically coupled to an outer portion.

In one embodiment, at least one of said distinct haptic device has three degrees of freedom (DOF).

In one embodiment, at least one of said distinct haptic device having three DOF is a five-bar linkage device.

In one embodiment, each coupling portion allows free rotation but provides a rigid translational connection.

In one embodiment, each coupling portion is a spherical end configured to be releasably engaged in a receiving socket of the distinct haptic device.

In one embodiment, the multimodal tool further comprises a processor coupled to said at least one body sensor and to a transceiver, the multimodal tool configured to transmit said orientation or three-dimensional position thereof to a computing device communicatively coupled to said tool and operating each distinct haptic device.

In accordance with another aspect, there is provided a computer-implemented method for providing haptic force feedback, comprising the steps of: detecting, by a processor, whether a tool is mechanically coupled to at least one haptic device; upon said tool being connected to a single haptic device, said processor operating said single haptic device to provide haptic force feedback in response to displacements in three-dimensional space of the tool by a user; or upon said tool being connected to two or more haptic devices simultaneously, said processor operating the two or more haptic devices as single haptic device having a greater number of degrees of freedom than the initial number of degrees of freedom of each haptic device alone to provide haptic force feedback in response to displacements of the tool by the user.

In one embodiment, the tool comprises at least one body sensor configured to provide an orientation or a three-dimensional position of said tool, and wherein said processor is further configured to operate said two or more haptic devices as said single haptic device based on said orientation or three-dimensional position.

In one embodiment, the processor is further configured to derive a plurality of three-dimensional positions of said tool and a plurality of links of said two or more haptic devices with respect to a common coordinate basis.

In one embodiment, the tool further comprises an attachment sensor communicatively coupled to said processor configured to provide an indication that said tool is mechanically coupled to at least one haptic device to said processor.

In one embodiment, at least one of said two or more haptic devices has three degrees of freedom (DOF).

In one embodiment, at least one of said distinct haptic device having three DOF is a five-bar linkage device.

In one embodiment, the method further comprises the step of, after said detecting, but before said operating: retrieving, by the processor, from a memory, a kinematic or dynamic model operable to describe the movements and forces corresponding to a number of haptic devices coupled to the tool, and wherein said operating is based on said kinematic or dynamic model.

Other aspects, features and/or advantages will become more apparent upon reading of the following non-restrictive description of specific embodiments thereof, given by way of example only with reference to the accompanying drawings.

BRIEF DESCRIPTION OF THE DRAWINGS

Several embodiments of the present disclosure will be provided, by way of examples only, with reference to the appended drawings, wherein.

Figure 1A:
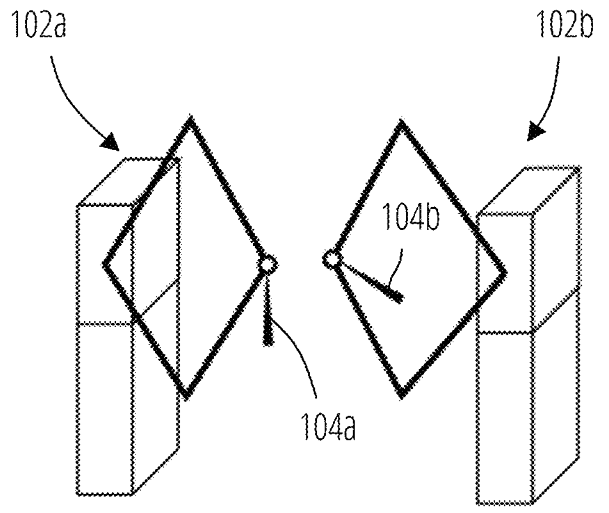
FIG. 1A and FIG. 1B are schematic diagrams two 3-DOF haptic force feedback devices being used independently (FIG. 1A), or use jointly with a multimodal tool as a single 5-DOF haptic force feedback device, in accordance with one embodiment.

Elements in the several drawings are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

The systems and methods described herein provide, in accordance with different embodiments, different examples of a multimodal haptic tool that allows to seamlessly connect on-the-fly two or more haptic devices together to be used simultaneously as a single haptic device having an increased number of degrees of freedom (DOF). This allows a set of two or more haptic devices to act in lower and higher DOF modes, which can be switched therebetween during regular device use. To this end, the proposed solution, in accordance with different embodiments, uses quick release connectors to connect the devices to the tool. The tool, which can be equipped with attachment sensors and an orientation sensor provides information about its states to the processor, which uses this data to detect the mode of the device and help with its automatic calibration. In some embodiments, the haptic devices can be equipped with orientation sensors to allow them to be configured in any orientation, and optionally with position sensors to improve accuracy of the calibration. The sensor data from the tool and the devices allows for estimation of the device position in space which can then be used to adapt, select, generate, or derive kinematic and dynamic equations or select mathematical models representative of the new system comprising the combined haptic devices that is then controlled and operated by a main processor, for example located on a separate computing device communicatively coupled to the haptic devices and the tool.

Different embodiments may be considered that work with a wider range of devices and configurations. For example, in some embodiments, the tool and coupling method described above could be expanded to work with more than two devices. The use of different position and orientation sensors can aid in providing a more accurate dynamic model of the device. It could also be possible for the devices to be connected to each other using a data transfer cable and for the kinematic calculations to be done completely on the board (e.g., on one haptic device itself). The estimation of the position can also be an online process that recalculates the estimated position as the user navigates the device workspace.

Figure 1B:
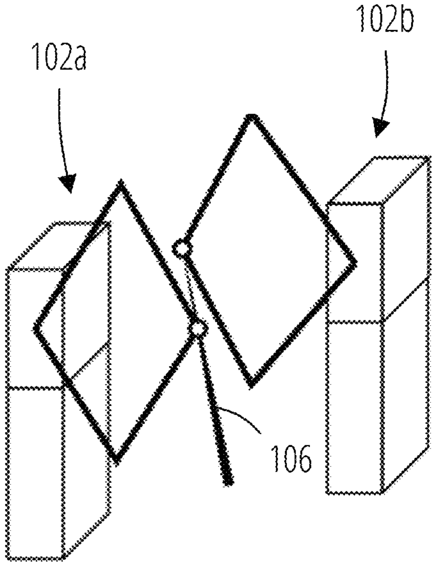

FIG. 1A shows a pair of haptic devices having three degrees of freedom (DOF) 102*a* and 102*b* connected to two tools 104*a* and 104*b* that are used simultaneously. In FIG. 1B, the same pair of devices 102*a* and 102*b* are shown connected to a single tool 106 thereby providing 5-DOF force feedback. In both scenarios, the tools contain a sensor for detecting the tool's connection state and an orientation sensor.

Figure 2A:
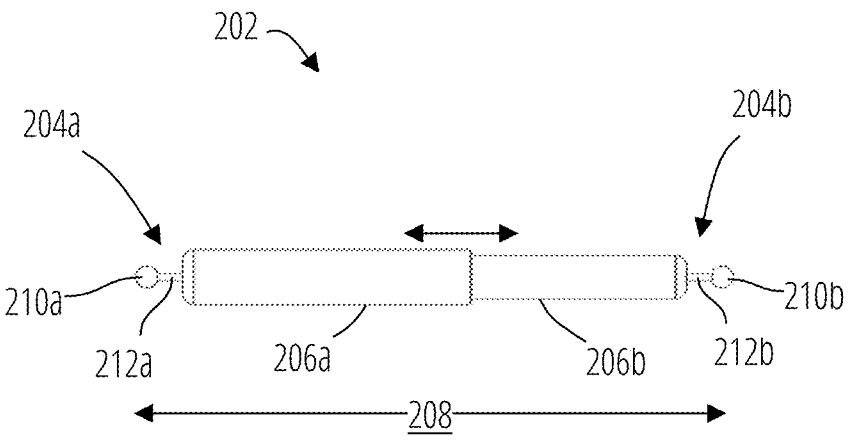
FIG. 2A and FIG. 2B are side views of a multimodal tool, in accordance with one embodiment.
Figure 2B:
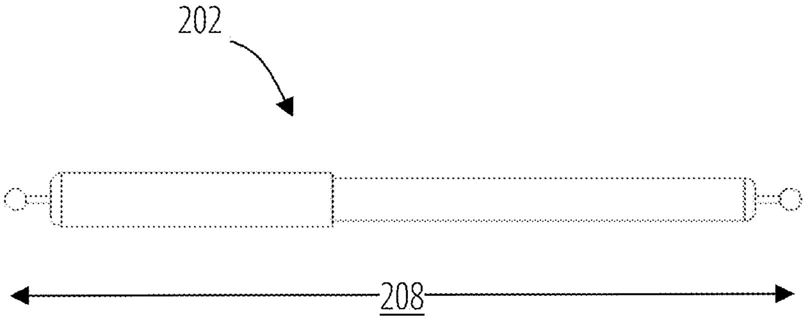
Figure 3A:
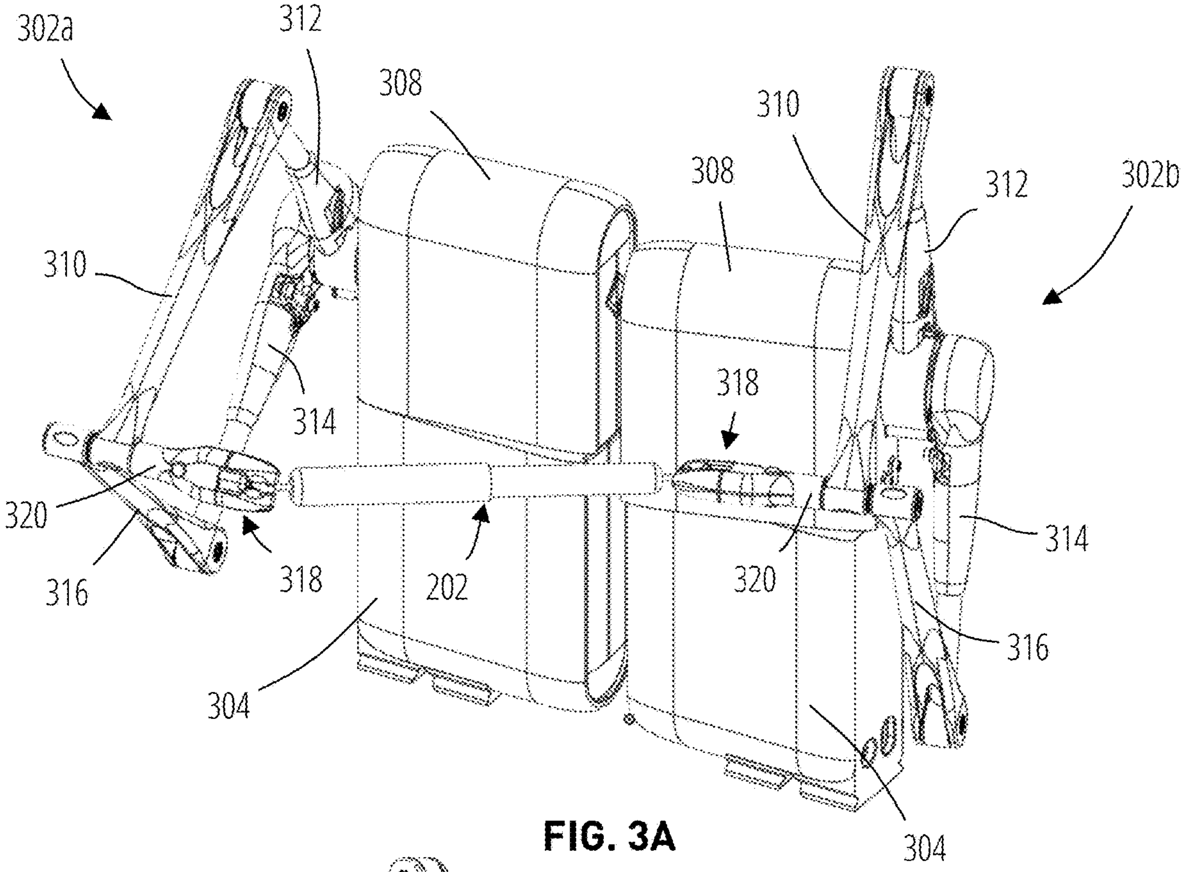
FIG. 3A is a perspective view of system comprising the multimodal tool of FIG. 2A and FIG. 2B simultaneously coupled to two haptic force feedback devices, in accordance with one embodiment.
Figure 3B:
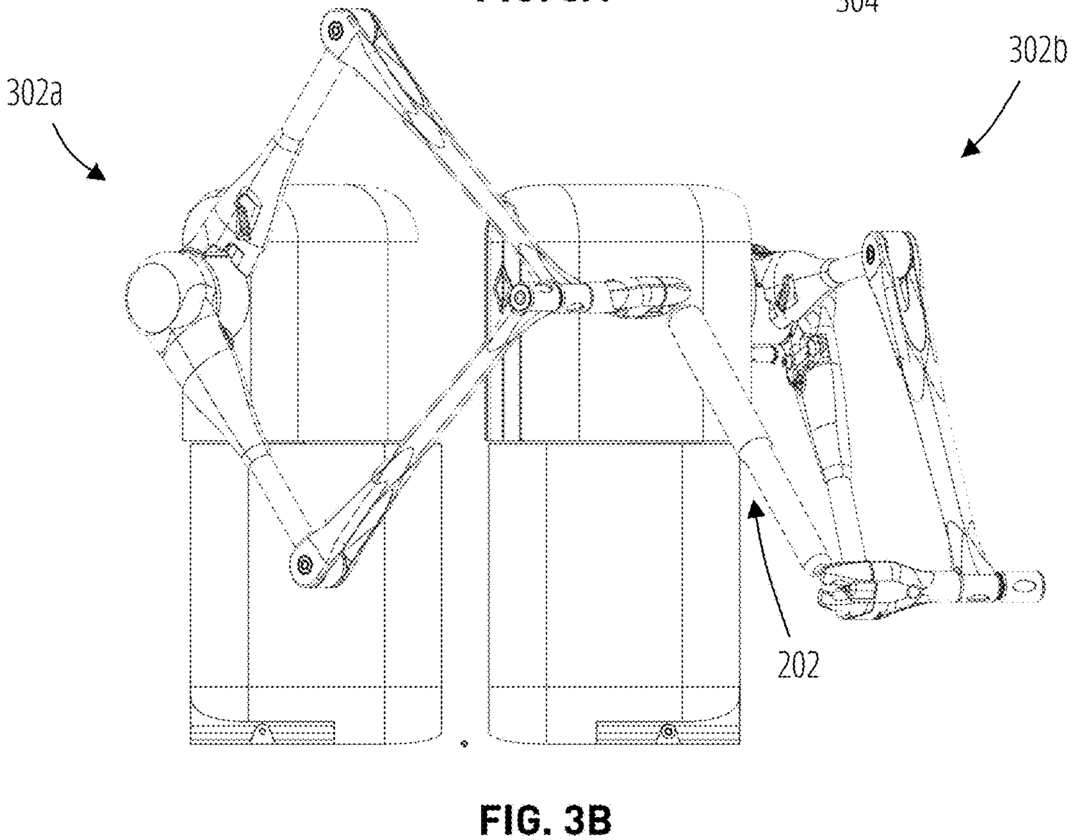
FIG. 3B is a front view of the system of FIG. 3A, in accordance with one embodiment.
Figure 3C:
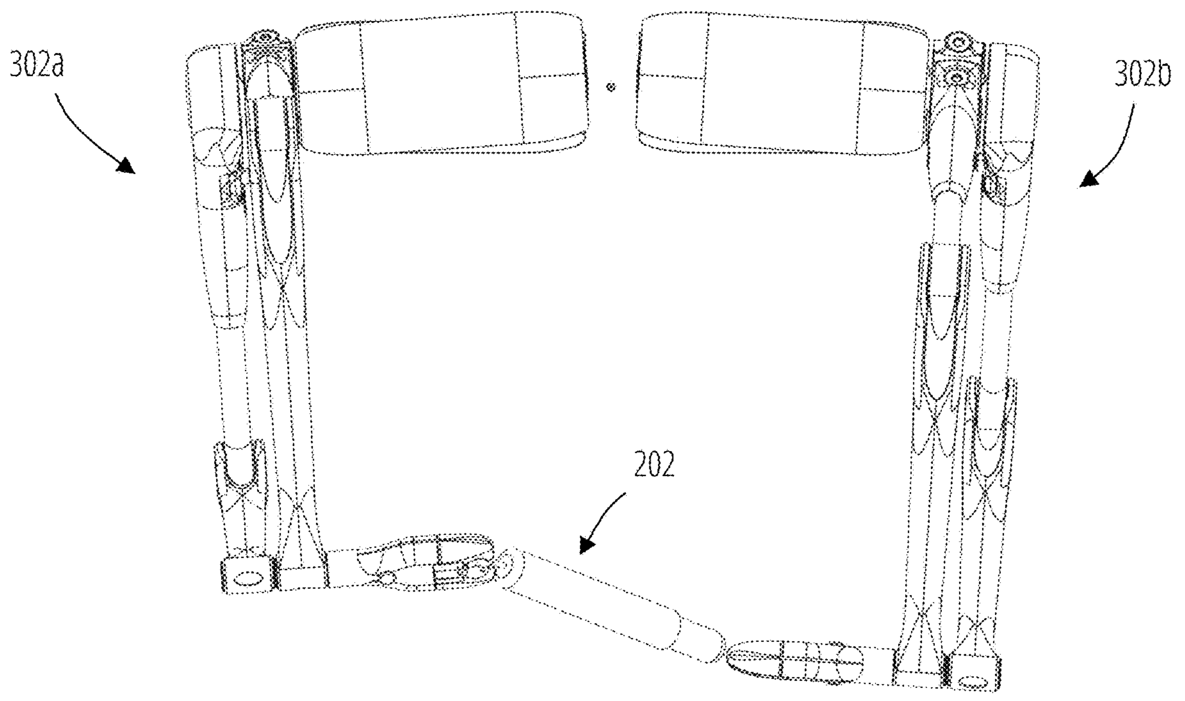
FIG. 3C is a first top view of the system of FIG. 3A, in accordance with one embodiment.
Figure 3D:
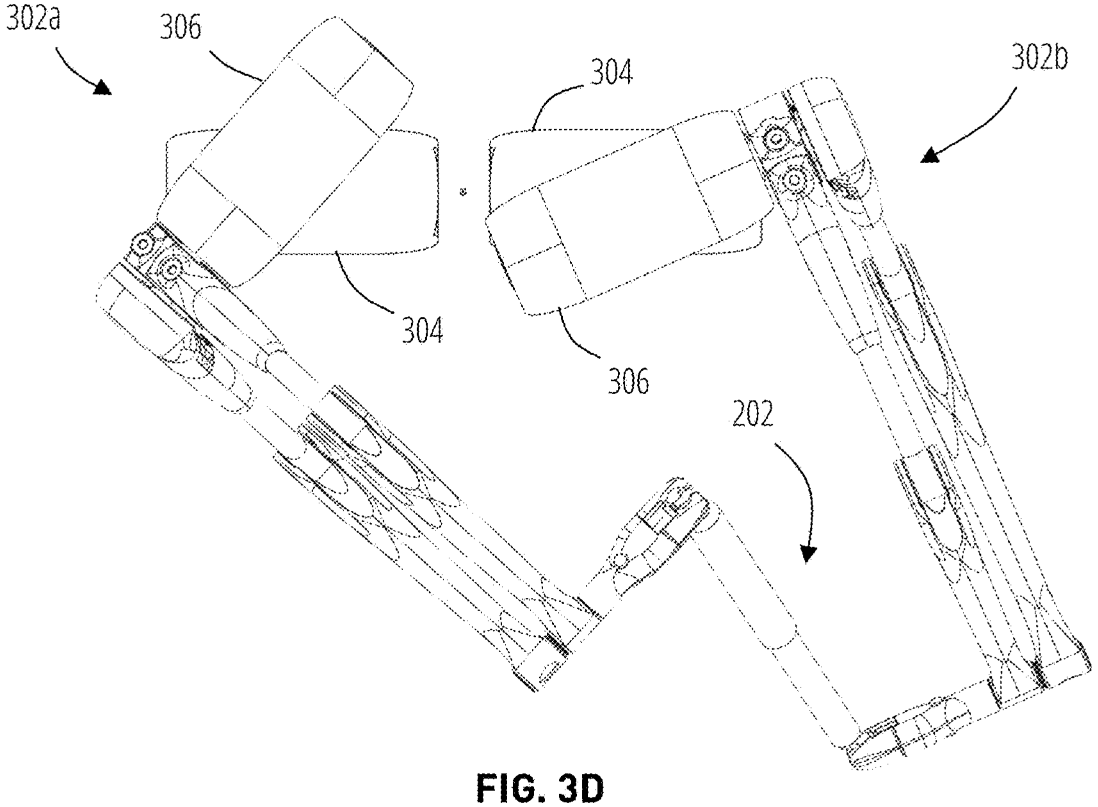
FIG. 3D is a second top view of the system of FIG. 3A, in accordance with one embodiment.
Figure 3E:
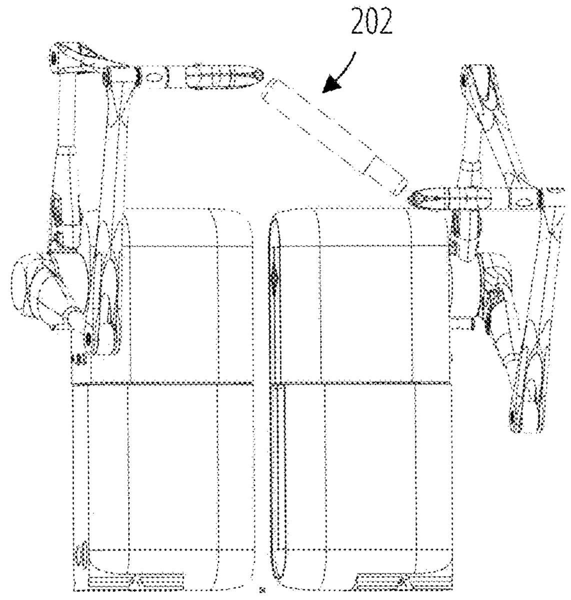
FIG. 3E, FIG. 3F, FIG. 3G, and FIG. 3H are different front views of the system of FIG. 3A are different configurations, in accordance with one embodiment.
Figure 3F:
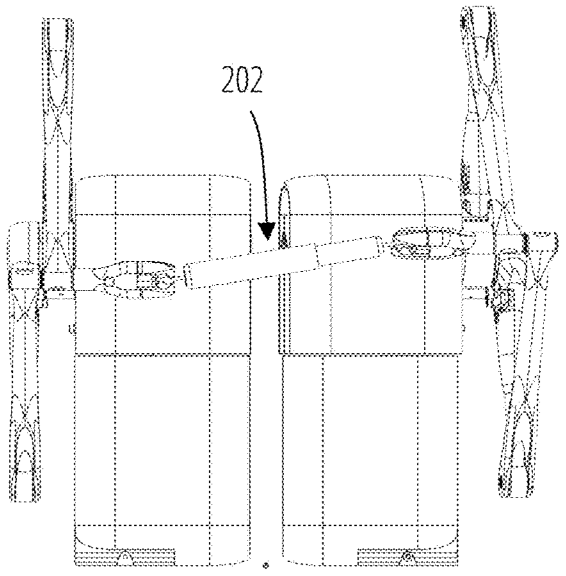
Figure 3G:
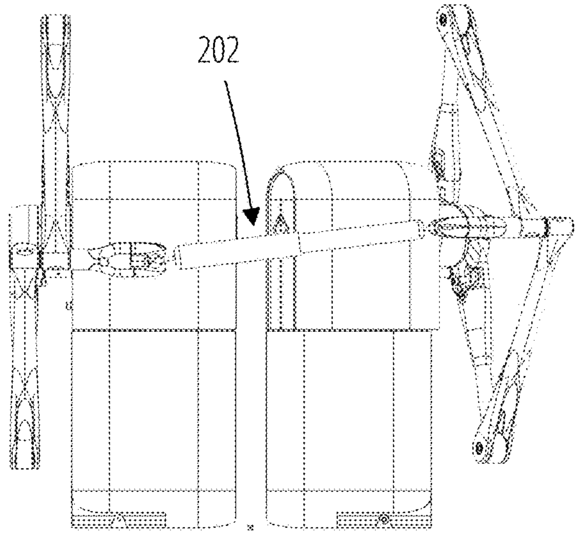
Figure 3H:
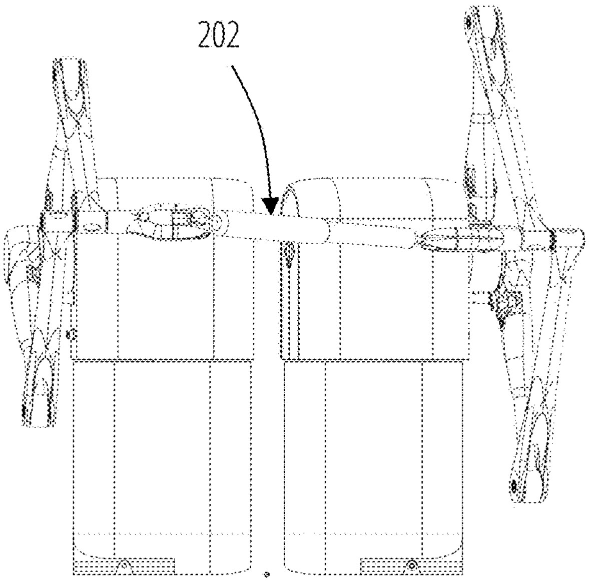

With reference to FIGS. 2A-2B, and FIGS. 3A-3H, and in accordance with one exemplary embodiment, a multimodal tool 202 and haptic feedback system comprising two haptic devices 302*a* and 302*b* will now be described. FIG. 2A and FIG. 2B show a multimodal tool 202 comprising an elongated body 206 having at each opposite end thereof a coupling portion 204*a* and 204*b*. In this example, the body 206 is shown as being substantially straight and cylindrical to be more easily held by a user's hand, although other shapes may be used as well. For example, handle-shaped bodies or curved bodies may also be considered. The body 206 is extensible so as to be elongated or retracted as needed. In this example, the body 206 comprises an inner portion 206*a* engaged on an outer portion 206*b*. The inner portion 206*a* outer portion 206*b* may readily be moved relative to one another to shorten (FIG. 2A) or elongate (FIG. 2B) a length 208 of the body 206. In some embodiments, this may be done via a telescopic configuration, wherein one body portion is slidingly movable relative to the other body portion. Other embodiments may have the body 206 having a fixed length, or use other known means to increase or decrease the length or shape. FIGS. 3A to 3H illustrate how the tool 202 may be mechanically releasably coupled to two haptic devices 302*a* and 302*b*. The devices 302*a* and 302*b* are shown being reversely symmetrically disposed as an example only. While the multimodal tool 202 may be used with a single haptic device, for example either device 302*a* or 302*b* alone, coupling the tool 202 to the two devices 302*a* and 302*b* as illustrated simultaneously allows both devices to be operated as a single system capable of providing force feedback in a greater number of degrees of freedom (DOF) than either device 302*a* or 302*b* alone.

In the illustrated embodiment, the coupling or attachment portions 204*a* and 204*b* are shown respectively as spherically shaped portions 210*a* and 210*b* coupled to attachment members 212*a* and 212*b*, respectively, projecting outwardly from the distal ends the body 206. The spherical portions 210*a* and 210*b* are configured to be received in the one of the male and female connecting portion 318 of a receiver assembly 320 at the end of the haptic force feedback devices 302*a* and 302*b*. Each haptic device 302*a* and 302*b* comprises a 5-bar linkage and a base having a bottom portion 304 and a top portion 306. The bottom portion 304 is configured to be affixed or secured to a surface, while the top portion 306 is rotatively coupled to bottom portion 304 thus allowing the top portion 306 to be rotated relative to the bottom portion 304 around a vertical axis thereof. The illustrated coupling portions, receiver assemblies, and haptic devices or apparatus are similar to the ones described in International Patent application PCT/IB2021/000644, the entire content of which is incorporated by reference.

Thus, the haptic devices 302*a* and 302*b* each comprise a plurality of links configured to provide haptic force feedback to the attached tool 202 while being displaced or moved in three-dimensional space by a user interacting in a virtual environment. For each haptic device, the links are shown comprising an exemplary first link 312, an exemplary second link 310, and exemplary third link 316 and an exemplary fourth link 314. The exemplary first link 312 and the exemplary fourth link 314 are directly engaged with the upper portion 308 base for pivoting movement about an horizontal axis relative to one another. The first link 312 and the second link 310 are directly engaged with one another for relative pivoting movement. The second link 310 and the third link 316 are directly engaged with one another for relative pivoting movement. The third link 316 and fourth link 314 are directly engaged with one another for relative pivoting movement. The first link 312 and third link 316 are not directly engaged with one another for relative pivoting movement. The second link 310 and the fourth link 314 are not directly engaged with one another for relative pivoting movement. The receiver assembly 320 can be rotatable relative to the second link 310 and third link 316. FIGS. 3A to 3H provide different views of the tool 202 being coupled to both devices 302*a* and 302*b* simultaneously in different configurations, illustrating the large number of positions and orientations that may be achieved.

The haptic devices 302*a* and 302*b* also comprise a plurality of motors, actuators or torque assemblies configured to actuate the top portion 306 and the plurality of links to provide directional force feedback, as will be readily understood by the skilled person in the art. The actual configuration of these actuators or torque assemblies may Advantageously, the illustrated coupling mechanism provides the ability to rotate each end of the tool 202 freely while providing a rigid translational connection. This allows the user to drag or move the receiver assembly 320 in three-dimensional space while still being able to rotate or change the orientation of the tool itself without resistance.

The haptic devices 302*a* and 302*b* illustrated herein are only examples of haptic devices that may be used with the multimodal tool 202, and other haptic force feedback devices or apparatus may readily be used as well, for example robotic arms or the like. In addition, other quick-connect coupling mechanisms known in the art may be used as well.

Figure 4:
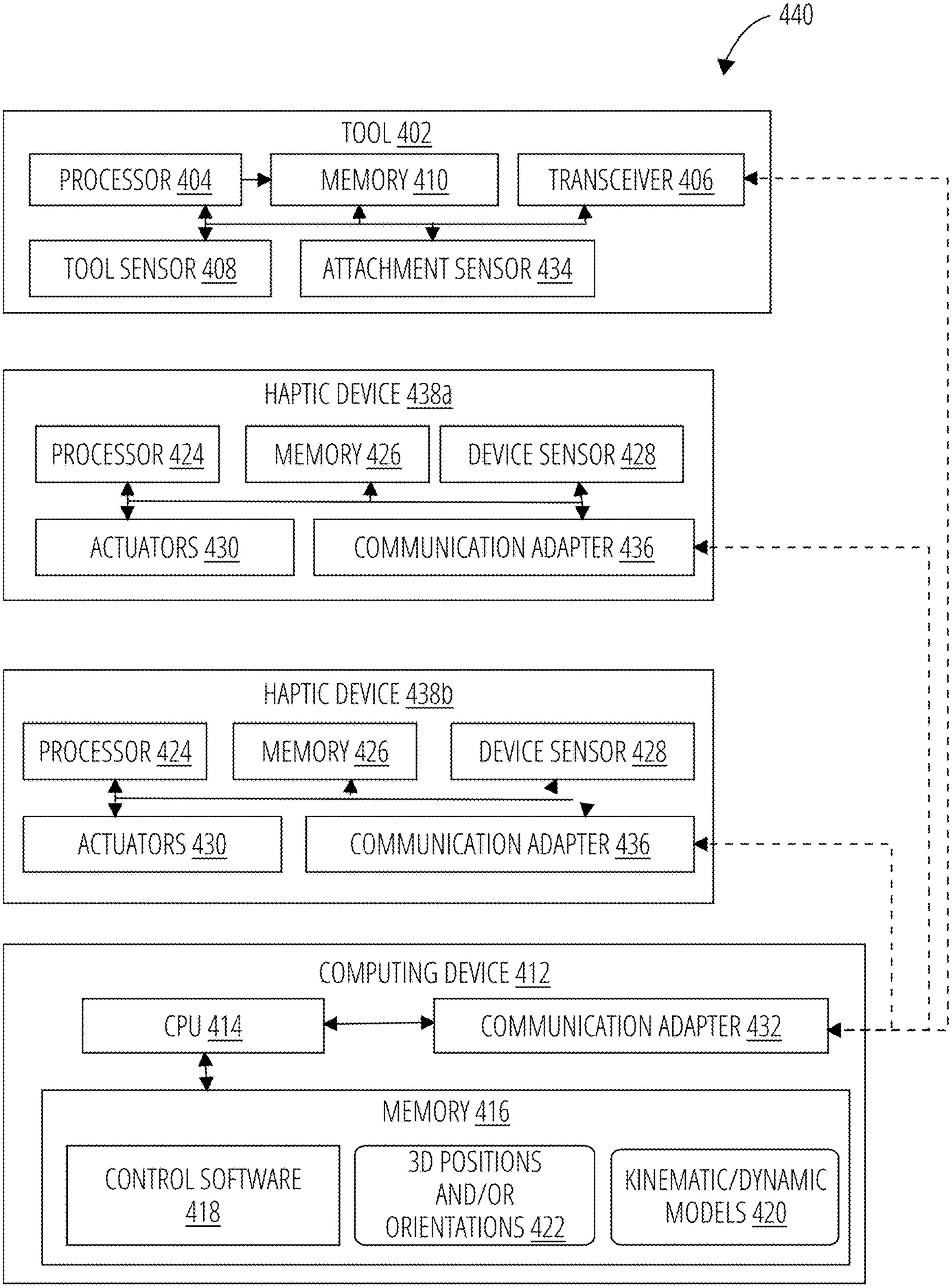
FIG. 4 is a schematic diagram illustrating a system comprising a multimodal tool, two haptic force feedback devices and a computing system, in accordance with one embodiment.

FIG. 4 is a schematic diagram illustrating a system 440 comprising a multimodal tool 402, two haptic devices 438*a* and 438*b*, and a computing device 412, in accordance with different embodiments. In FIG. 4 only two haptic devices are illustrated as an example only, and generally any number of devices may also be considered as long as the multimodal tool 402 comprises an equal number of coupling portions.

The tool 402, which may have the form of tool 202 in some embodiments but which is not limited thereto can further comprise at least one tool sensor 408 configured to sense at least one of a position of the tool and an orientation of the tool. The tool can further comprise a transceiver 406 disposed to receive signals from the at least one tool sensor 408 and wirelessly transmit the at least one of the position of the tool and the orientation of the tool to a computing device 412. The tool 402 may further comprise a processor 404 and a memory 410 communicatively coupled to the tool sensor 408 and the transceiver 406. In some embodiments, the tool 402 may further comprise one or more attachment sensors 434 configured to detect whether the tool 402 is mechanically coupled to one or more haptic devices (such as devices 438*a* and 438*b*). Upon detecting such a coupling, the tool 402 may communicate a corresponding coupling status indication to the computing device 412.

Each haptic device 438*a* and 438*b* typically comprises a one or more processors 424, for example in the form a microcontroller or other operably coupled to a memory 426, a plurality of actuators 430, at least one device sensor 428 and a communication adapter 436. The actuators 430 may include any actuation mechanism known in the art, for example capstan drives or the like configured to actuator some or all links or arms of the haptic device to provide force feedback. The at least one device sensor 428 is typically configured to track an absolute or relative orientation and/or position of each arm or link of the haptic device. This information may be communicated to a computing device 412 via the communication adapter 432 using a wired or wireless connection.

The computing device 412 acts as an exemplary controller or console operably communicatively coupled to the haptic devices 438*a* and 438*b*. This may include a dedicated computing device, a laptop, a desktop, a dedicated gaming device, a VR/AR device, a smartphone, a tablet or the like. It typically comprises a processor 414 coupled to a memory 416, the memory 416 being a non-transitory storage media comprising stored thereon a control software 418 having instructions for controlling and operating the haptic devices 438*a* and 438*b*, individually or as one device upon the tool 402 being mechanically coupled to both devices 438*a* and 438*b* simultaneously. To do so, the control software 418 may rely on a plurality of 3D positions and/or orientations 422 of the haptic devices 438*a* and 438*b* (or parts, links or arms thereof), and of the tool 402. In addition, operation of each haptic device further relies on one or more pre-programmed or generated kinematic or dynamic model 420 corresponding to the active configuration of the system, typically meaning whether the computing device 412 is operating each haptic device independently or jointly. These models would readily be known in the art and will not be described here in detail.

The computing device 412 further comprises a communication adapter 432 configured to receive wireless or wired signals from the tool 402 and each haptic device 438*a* and 438*b*. These signals received by the computing device 412 from the at least one device sensor 428 from one or more haptic devices 438*a* and 438*b* correspond to the sensed conditions. The processor 414 also be configured to determine, in response to the signals, at least one of the position of the haptic device within the three-dimensional space and the orientation of the haptic device relative to rotation in the three-dimensional space. The processor 414 can also be configured to communicate to the haptic devices 438*a* and/or 438*b* the at least one of the position of the tool 402 within the three-dimensional space and the orientation of the apparatus relative to rotation in the three-dimensional space.

The transceiver 406, communication adapter 432 and 436 may be configured to communicate wirelessly via protocols such as Bluetooth, near field communications, Wi-Fi, and/or any other wireless communications protocol or technology capable of being understood by anyone skilled in the art. In some embodiments, they may also be configured to communicate via a wired connection.

In some embodiments, at least some functions performed by processor 414 may also be performed, at least in part, by other processors, for example processor 424 of the haptic device, without limitation. In addition, some functionality may also be partially shared with one or more remote servers (not shown) communicatively coupled to the computing device 412 via a network, such as the internet.

Figure 5:
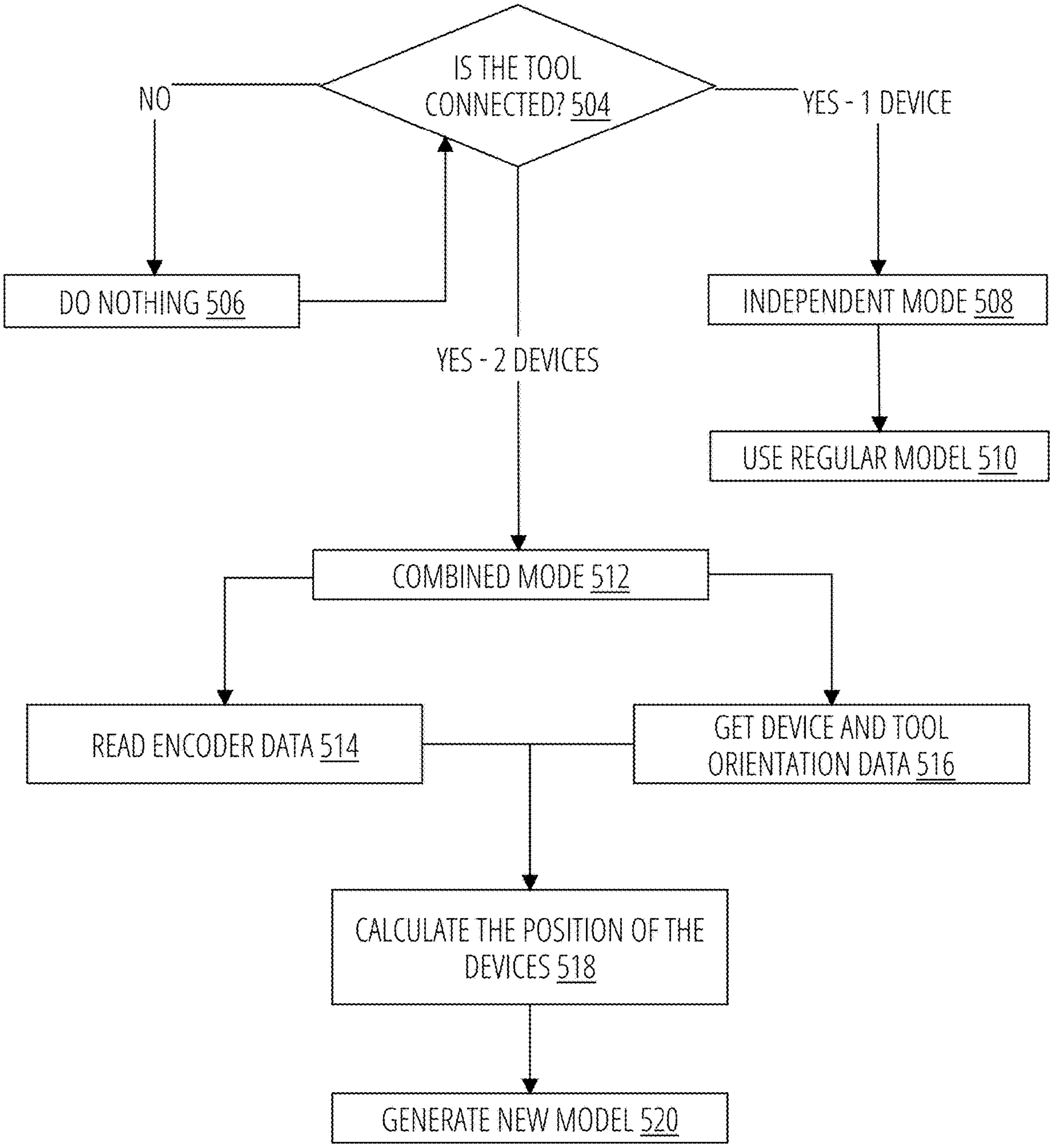
FIG. 5 is a flow diagram illustrating a method for providing haptic feedback with a multimodal tool, in accordance with one embodiment.

The flow chart illustrated in FIG. 5 shows the exemplary logic for switching between different modes of operation and the actions required to enter each connection state. In one embodiment, the method may be performed by the computing device, such as computing device 412 for example, communicatively coupled to both the tool and the two haptic devices. At step 502, the processor detects whether the tool is connected to a haptic device. This may be done as discussed above, for example by having the tool itself monitor its state via the attachment sensor 434 and communicating any change thereof to the computing device 412. If the tool 402 is not connected, then nothing is done at step 506 and the computing device 412 may return to step 504 until a connection is detected. If the tool is connected to a single haptic device (either device 438*a* or 438*b*), then at step 508 the processor operates the haptic device in an independent mode (e.g., as an independent device) and uses at step 510 the corresponding kinetic and/or dynamic model (s) to operate the haptic device. At step 512, if the processor detects or detects that two haptic devices are connected (e.g., combined mode), then the processor simultaneously read encoder data at step 514 and obtains the tool and devices orientation data at step 516 from both haptic devices 438*a* and 438*b* and the tool 402. From the encoder data and orientation data, the processor may calculate at step 518 a position in three-dimensional space of the haptic devices (including each link) and the tool relative to a common coordinate basis. At step 520, the processor may generate or select a new kinematic and/or dynamic model(s) that corresponds to the current combined configuration, and allows the processor to operate both haptic devices simultaneously to provide haptic force feedback to the tool.

The functionality described herein can be performed, at least in part, by one or more hardware logic components. According to an embodiment, the computing apparatus is configured by the program code when executed by the processor(s) to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

By way of example, and not limitation, computer-readable media or memory can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, or other magnetic storage devices, or any other medium which can be used to store the desired information and which can be accessed by the computer.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Information as herein shown and described in detail is fully capable of attaining the above-described object of the present disclosure, the presently preferred embodiment of the present disclosure, and is, thus, representative of the subject matter which is broadly contemplated by the present disclosure.

What is claimed is:

1. A system comprising:

at least one haptic force feedback device; and a multimodal tool comprising:

a body comprising one or more coupling portions, each coupling portion configured to be releasably and respectively mechanically coupled to said at least one haptic force feedback device and another distinct haptic device;

wherein upon said multimodal tool being coupled to said at least one haptic force feedback device and to the other distinct haptic device, the multimodal tool being configured to be operational with each of said at least one haptic force feedback device and the other distinct haptic device simultaneously as a single haptic device having a greater number of degrees of freedom than the initial respective number of degrees of freedom of each of said at least one haptic force feedback device and the other distinct haptic device alone;

wherein said body is an elongated body comprising a coupling portion at each opposite end thereof; and wherein a length of said elongated body is extendable.

2. The system of claim 1, wherein said body comprises an inner portion telescopically coupled to an outer portion.

* * * * *